Sept. 18, 1951  J. SMID ET AL  2,568,093
RETRACTABLE STEP
Filed April 2, 1949  2 Sheets-Sheet 1
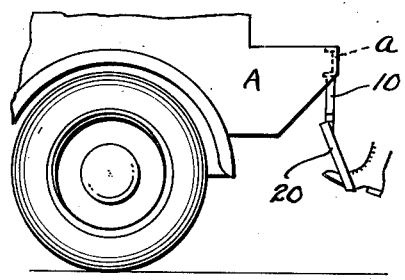
*Fig. 1*
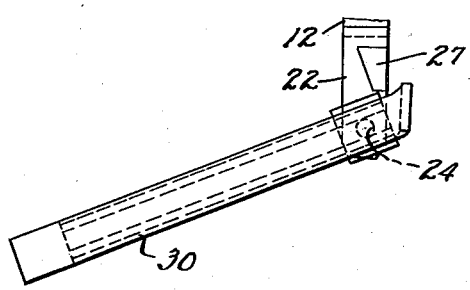
*Fig. 4*
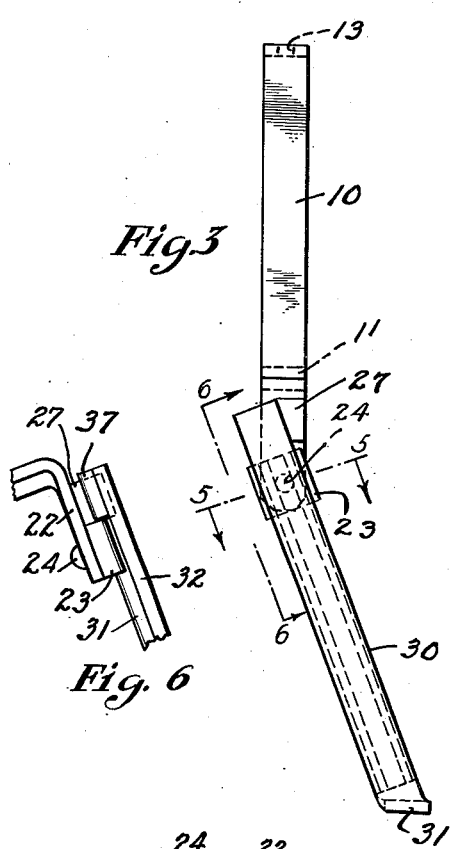
*Fig. 3*
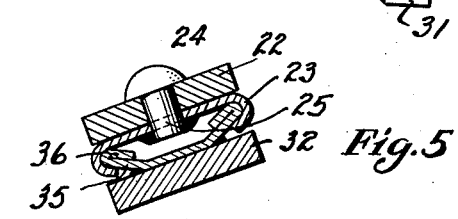
*Fig. 6*
*Fig. 5*
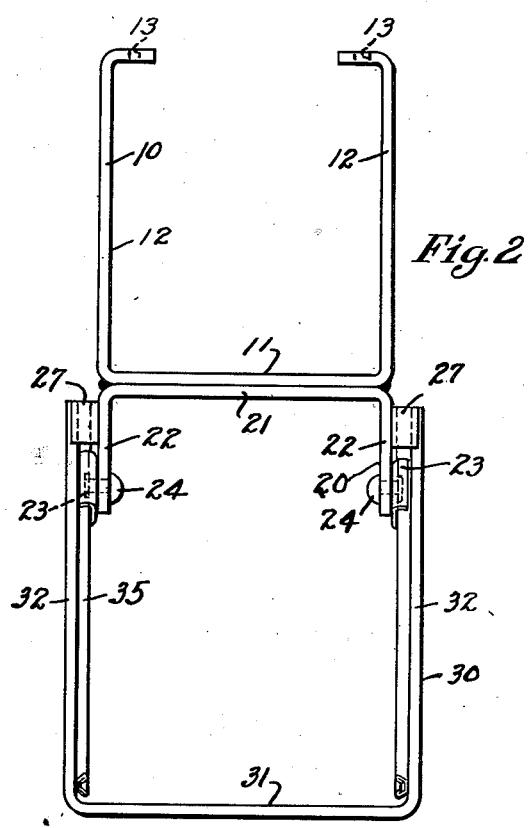
*Fig. 2*
INVENTORS
JAMES SMID and
ERNEST L. SINGLE
By Bates, Teare, v McKean
Attorneys Sept. 18, 1951 J. SMID ET AL 2,568,093
RETRACTABLE STEP
Filed April 2, 1949 2 Sheets-Sheet 2
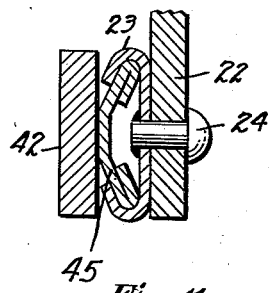
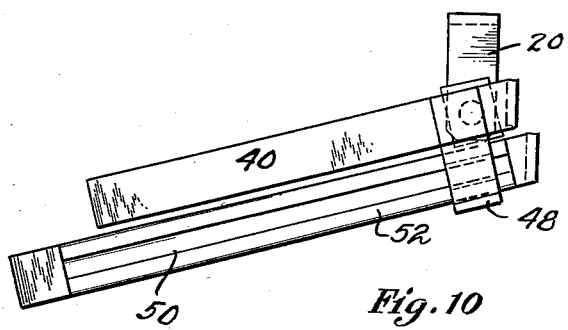
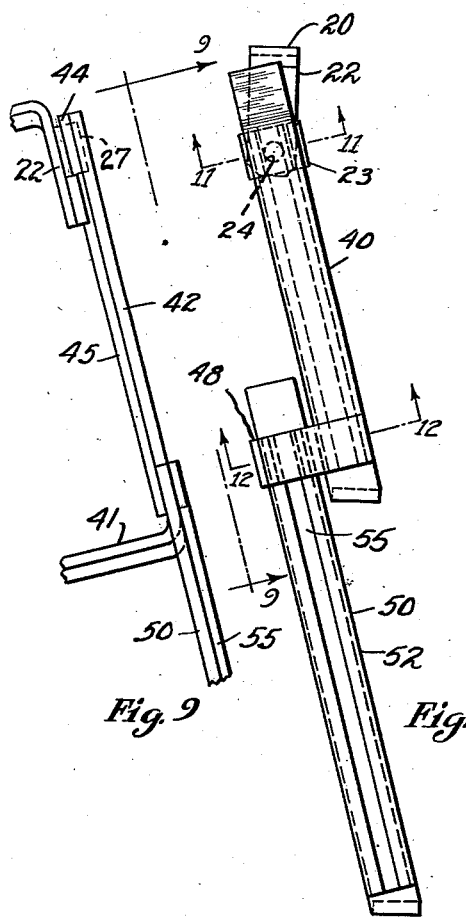
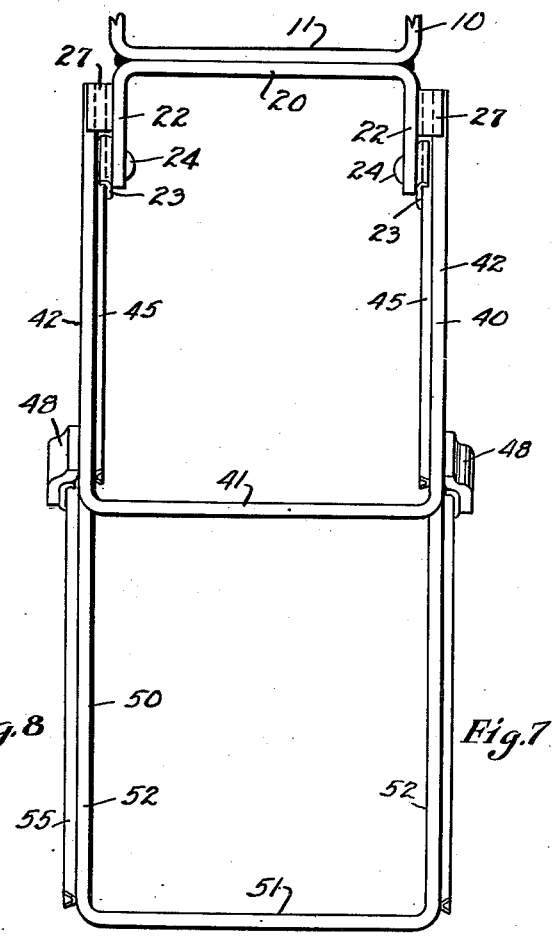
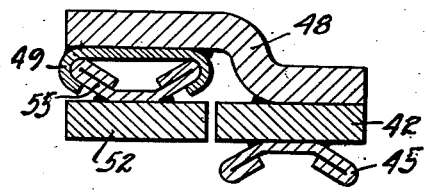
INVENTORS
JAMES SMID and
ERNEST L. SINGLE
By Bates, Teare & McBean
Attorneys Patented Sept. 18, 1951

2,568,093

UNITED STATES PATENT OFFICE 2,568,093

RETRACTABLE STEP

James Smid, Cleveland, and Ernest L. Single, Maple Heights, Ohio, assignors, by mesne assignments, to McCabe-Powers Auto Body Co., St. Louis, Mo., a corporation of Missouri Application April 2, 1949, Serial No. 85,242

9 Claims. (Cl. 280—164)

This invention relates to a retractable step or step ladder especially adapted for use on vehicles where the region to be reached stands at a considerable height above the ground. The object is to provide in a very simple manner a step having a plurality of foot treads and adapted to be so attached to the vehicle that it may be readily folded when not in use into idle position, so as not to increase the overall length or width of the vehicle. Our invention provides at least two treads and may have more, and is illustrated in the drawings in two different forms one having two treads, the other three treads.

In the drawings, Fig. 1 is a fragmentary view of the rear portion of a vehicle with one form of our step attached to the rear end of the vehicle; Fig. 2 is an end view of the step of Fig. 1 in position of use, but on a larger scale than Fig. 1; Fig. 3 is a side elevation of this embodiment; Fig. 4 is a view of this embodiment in retracted position; Fig. 5 is a cross section indicated by the line 5—5 on Fig. 3; Fig. 6 is a fragmentary perspective of parts of the step adjacent the junction of the supporting member and retractable member. The remaining figures illustrate an embodiment having three treads. In these views, Fig. 7 is an elevation of the three-tread embodiment, extended; Fig. 8 is an edge view of this embodiment; Fig. 9 is a fragmentary view looking at the edge of Fig. 8; Fig. 10 is a view of this embodiment retracted; Figs. 11 and 12 are cross sections on the correspondingly numbered lines on Fig. 8.

Referring first to the embodiment of Figs. 1 to 6, 10 indicates a stirrup comprising a flat bar bent into a rectangular U-shape having a straight bottom portion 11 and upwardly extending sides 12. The upper ends of these sides are adapted to be secured to some convenient portion of the vehicle projecting as at the rear or side, and are shown as having inturned portions 13 which may be riveted or otherwise secured to the vehicle frame, as for instance to the end sill $a$ of the vehicle A in Fig. 1.

The lower member 11 of the securing stirrup 10 provides a flat horizontal tread. To the underside of this is welded a reverse stirrup 20. This latter stirrup has a horizontal reach 21, reinforcing the tread member 11, and has two downwardly extending arms 22. Guiding clips 23 are pivotally secured, preferably by rivets 24, to the outer faces of the arms 22.

The guiding clips 23 have inwardly turned edges 25 (shown especially in Fig. 5) and in the guideway thus provided are slidably mounted outwardly flaring strips 35 on the inner face of upstanding members 32 of a third stirrup 30. The upright strips 35 are preferably sheet metal members secured to the inner faces of the stirrup arms 32 by welding and the free edges of these strips 35 are reinforced by having portions thereof doubled onto the body portion as shown at 36, Fig. 5.

Welded to the upper end portions of the stirrup arms 32 on their inner sides are suitable blocks 37 which limit the extension of the stirrup 30, and secured to the outer face of the arms 22 of the stirrup 20 are blocks 27 which form abutments for the upper ends of the arms 32.

The blocks 27 and 37 hold the stirrup 30 in the position shown in Fig. 3, when it has been extended for use. In this position, the horizontal reaches 11 and 31 of the two stirrups 10 and 30 provide horizontal foot treads. This makes a very convenient step ladder to allow one to ascend from on the ground to the platform of the vehicle.

When it is desired to fold the device into idle position, the operator swings the stirrup 30 upwardly and then slides it inwardly, causing the guiding bars 35 to slide within the clips 23, the whole stirrup 30 swinging on the pivots 24, until the stirrup 30 is in idle position, where gravity holds it, as shown in Fig. 4.

Where the platform to be mounted is of such height that three steps are desired, the embodiment of Figs. 7 to 12 will be used. In this embodiment, the supporting member, secured to the vehicle and partly shown in Fig. 10, is the same as in Fig. 2, and has welded to its lower reach 11 a stirrup 20 pivotally carrying the guiding clips 23, the same as in Fig. 2.

In this case, however, in place of the exact stirrup 30, we provide a stirrup 40 which has a tread portion 41, side arms 42, guiding strips 45 and stop blocks 27, the same as the stirrup 30, but in addition to this we secure, preferably by welding to the lower portion of the sides 42, short transverse plates 48 which are offset outwardly, as shown in Figs. 7 and 12. On the inner face of the offset portion we weld in rigid position guiding clips 49 having inturned edges similar to the edges 25 of the clips 23.

The second extension member 50, shown in Figs. 7, 8 and 10, comprises a stirrup having at its lower end a tread portion 51 and having two upright arms 52 to the outer side of which are welded the strips 55 of similar construction to the strips 35 and 45 of Figs. 2 and 7. These strips 55 slide within the clips 49 carried by the plates 48.

When the construction of Figs. 7 to 12 is extended, as shown in Figs. 7 and 8, a step ladder of three treads is provided, namely the transverse bars 51, 41 and 11, each of which extend horizontally both crosswise as well as lengthwise.

To collapse the construction of Figs. 7 and 8 for storage, or when the vehicle is about to travel, it is only necessary to swing the ladder outwardly and upwardly and slide the stirrup 50 along the stirrup 40 and the latter along the pivoted guides 23 carried by the stationary stirrup 20, so that the parts pass into the position shown in Fig. 10, where each of them lies well within the confines of the vehicle.

If desired, the construction of Figs. 7 to 12 may be employed as a two-tread ladder by securing the stirrup 20 directly to the vehicle, instead of to the bottom of a fixed stirrup constituting the top step.

It will be seen that our extensible step ladder, in either form shown, is of very simple construction, and may be readily applied to existing vehicles. When in idle position it occupies unused space beneath the vehicle platform, but may be readily extended and swung to operative position whenever desired.

We claim:

1. A retractable ladder comprising a pair of supporting arms, a pair of clips with inwardly curled edges pivoted respectively to said supporting arms, a stirrup having a tread and side arms, and strips secured to the side arms of said stirrup and having oppositely flaring edges which are slidable engaged within the inwardly curled edges of the clips.

2. In a retractable step, the combination of a pair of supporting arms, a pair of clips pivoted respectively to said arms, each clip comprising a base portion and inwardly curled edge portions, a stirrup having a tread portion and a pair of parallel arms and strips secured to said stirrup arms, each strip having an intermediate portion engaging the arm and edge portions flaring away from the arm and then doubled on itself to reinforce them, said reinforced edge portions of the strips slidably interlocking with the curled-in portions of the clips.

3. The combination of a pair of supporting arms, a stirrup having a tread and two side arms, clips pivotally secured to the supporting arms, strips on the side arms of the stirrup slidably interlocked with said clips and blocks on the side arms adapted to overhang and be engaged by the side arms of the stirrup when extended to hold the same in a downward and outwardly inclined position, the tread portion of the stirrup being tipped at an angle to the side arms to be horizontal when the side arms are held in said inclined position.

4. The combination of a depending stirrup secured to a support and having an intermediate horizontal portion providing a tread, a second stirrup with downwardly extending arms having its intermediate portion secured to the underside of said tread, a pair of clips pivotally secured to the arms of the second stirrup, a third stirrup having an intermediate portion constituting a tread and having parallel side arms, and strips on said side arms slidably interlocking with said clips.

5. The combination with a stirrup adapted to be rigidly secured to a vehicle and having downwardly depending arms connected by a transverse tread, an oppositely facing stirrup welded to the bottom of the first-mentioned stirrup and having downwardly extending arms, a pair of clips pivoted to the arms of the last-mentioned stirrup, a third stirrup having a tread portion and a pair of parallel side arms, strips secured to the last-mentioned side arms and slidably interlocking with the clips, stops on the downward arms of the second stirrup to limit the swing of the third stirrup and stops on the upper end of the third stirrup to limit its downward movement.

6. In an extensible ladder, the combination of a pair of supporting arms, a pair of clips respectively pivoted to said arms, a stirrup having a tread portion and parallel side arms, strips on the said side arms slidably interlocking with the clips, a second pair of clips carried by the side arms of said stirrup, another stirrup having a tread and parallel side arms, and strips on the last-mentioned side arms slidably interlocking with the second pair of clips.

7. The combination with a supporting stirrup having a pair of downwardly extending arms, clips pivotally secured to said arms, a second stirrup having a tread and a pair of parallel arms, strips on the last-mentioned arms slidably interlocking with the clips, plates secured to the arms of the second stirrup near said tread, clips carried by said plates, a third stirrup having a tread and parallel side arms, and strips secured to the last-mentioned side arms and slidably interlocking with the last-mentioned clips.

8. The combination, with a pair of downwardly extending supporting arms, a pair of clips pivotally secured on the outer side of said arms, a stirrup having an intermediate tread portion and two parallel side arms, strips secured to the inner face of said side arms and slidably interlocking with said clips, plates secured to the stirrup near its tread and offset outwardly, clips rigidly secured on the inner face of the offset portion of said plates, another stirrup having a tread portion and parallel side arms, and strips on the outer face of the last-mentioned side arms slidably interlocked with the last-mentioned clips.

9. The combination with a vehicle, of a depending stirrup secured thereto and having an intermediate horizontal portion providing a tread, a second stirrup with downwardly extending arms having its intermediate portion secured to the underside of said tread, a pair of clips pivotally secured to the outer sides of the arms of the second stirrup, a third stirrup having an intermediate portion constituting a tread and having parallel side arms, strips on the inner face of said arms slidably interlocking with said clips, blocks on the arms of the second stirrup to limit the swing of the third stirrup, blocks on the upper end of the third stirrup to limit its extension with reference to the second stirrup, outwardly offset plates rigidly secured to the outer faces of the arms of the third stirrup near the tread thereof, a pair of clips rigidly secured to the inner face of the outwardly offset portion of said plates, and a fourth stirrup having an intermediate portion consituting a tread having a pair of parallel side arms, and strips secured to the outer face of the last-mentioned side arms and slidably interlocking with the last-mentioned clips.

JAMES SMID.
ERNEST L. SINGLE.

REFERENCES CITED

The following references are of record in the file of this patent:

UNITED STATES PATENTS

| Number | Name | Date |
| --- | --- | --- |
| 504,446 | Dodd | Sept. 5, 1893 |
| 600,764 | Baily | Mar. 15, 1898 |
| 645,867 | Milhime | Mar. 20, 1900 |
| 805,971 | Mettler | Nov. 28, 1905 |
| 1,813,865 | Reese | July 7, 1931 |
| 2,209,576 | McDonald | July 30, 1940 |

FOREIGN PATENTS

| Number | Country | Date |
| --- | --- | --- |
| 516,683 | Germany | Jan. 26, 1931 |